(12) United States Patent
Kulick, III et al.

(10) Patent No.: US 11,293,705 B2
(45) Date of Patent: Apr. 5, 2022

(54) OPEN MESH MEMBERS AND RELATED FILL PACKS

(71) Applicant: Brentwood Industries, Inc., Reading, PA (US)

(72) Inventors: Frank M. Kulick, III, Reading, PA (US); Luke Lingle, Reading, PA (US); William Miller, Reading, PA (US)

(73) Assignee: BRENTWOOD INDUSTRIES, INC., Reading, PA (US)

( * ) Notice: Subject to any disclaimer, the term of this patent is extended or adjusted under 35 U.S.C. 154(b) by 0 days.

(21) Appl. No.: 17/293,087

(22) PCT Filed: Nov. 21, 2019

(86) PCT No.: PCT/US2019/062535
§ 371 (c)(1),
(2) Date: May 12, 2021

(87) PCT Pub. No.: WO2020/106919
PCT Pub. Date: May 28, 2020

(65) Prior Publication Data
US 2021/0389064 A1 Dec. 16, 2021

Related U.S. Application Data

(60) Provisional application No. 62/770,244, filed on Nov. 21, 2018.

(51) Int. Cl.
*F28F 25/08* (2006.01)
*B01J 19/32* (2006.01)
*F28F 21/06* (2006.01)

(52) U.S. Cl.
CPC ............. *F28F 25/085* (2013.01); *B01J 19/32* (2013.01); *F28F 21/06* (2013.01);
(Continued)

(58) Field of Classification Search
CPC .............. B01J 19/32; B01J 2219/32286; B01J 2219/32483; B01J 2219/32258;
(Continued)

(56) References Cited

U.S. PATENT DOCUMENTS 4,477,394 A * 10/1984 Armstrong ............ F28F 25/085
210/150
4,518,544 A 5/1985 Carter et al.
(Continued)

FOREIGN PATENT DOCUMENTS

CH 677024 A5 * 3/1991 ............ F28F 25/087
DE 19733480 A1 2/1999
(Continued)

OTHER PUBLICATIONS

Accu-Pac Film Fill Media with Beveled Tips—Brentwood Industries, 2011 ©.

*Primary Examiner* — Charles S Bushey
(74) *Attorney, Agent, or Firm* — Panitch Schwarze Belisario & Nadel LLP

(57) ABSTRACT

An open mesh member for insertion into a cooling tower utilizing polluted or clean water and counterflow or crossflow airflow includes a plurality of corrugations including upper support frames, lower support frames and a wall strand. The upper and lower support frames extend at a corrugation angle relative to a height axis. The corrugations have a plurality of openings through a thickness of the mesh member. A planar edge positioned at a first end of the mesh member. A beveled edge positioned at a second end of the mesh member. The beveled edge includes a first bevel extending distally from one of the upper support frames. The bevel includes first and second legs and a distal end. The first and second legs extend substantially parallel relative to the associated upper support frame.

21 Claims, 4 Drawing Sheets

(52) U.S. Cl.
CPC ................. *B01J 2219/32286* (2013.01); *B01J 2219/32483* (2013.01); *F28F 2275/085* (2013.01)

(58) Field of Classification Search
CPC .......... F28F 21/06; F28F 25/08; F28F 25/085; F28F 25/087; F28F 2275/085; F28F 2275/143
USPC .................... 261/110, 112.1, 112.2, DIG. 72
See application file for complete search history.

(56) References Cited

U.S. PATENT DOCUMENTS

| | | | |
|---|---|---|---|
| 4,728,468 A * | 3/1988 | Duke | B01J 19/32 261/111 |
| 4,732,713 A | 3/1988 | Korsell | |
| 4,996,008 A * | 2/1991 | Peterson | F28F 25/085 261/111 |
| 5,017,309 A * | 5/1991 | Peterson | B01J 19/325 261/111 |
| 5,124,086 A | 6/1992 | Schultz | |
| 5,147,583 A | 9/1992 | Bugler, III et al. | |
| 5,242,627 A | 9/1993 | Lundin | |
| 5,865,242 A * | 2/1999 | Neri | B01J 19/32 165/115 |
| 6,096,407 A * | 8/2000 | Vodicka | F28F 25/087 428/175 |
| 6,206,350 B1 | 3/2001 | Harrison et al. | |
| 7,025,339 B2 * | 4/2006 | Meski | F25J 3/04909 261/94 |
| 8,834,058 B2 | 9/2014 | Woicke | |
| 9,555,390 B2 | 1/2017 | Krell et al. | |
| 2005/0280168 A1 | 12/2005 | Meski et al. | |

FOREIGN PATENT DOCUMENTS

| | | | |
|---|---|---|---|
| EP | 1152205 B1 | 7/2004 | |
| GB | 1596840 A | 9/1981 | |
| WO | WO-9906784 A1 * | 2/1999 | ............ F28F 25/087 |
| WO | WO-2020113064 A1 * | 6/2020 | ............. C02F 3/101 |

* cited by examiner

OPEN MESH MEMBERS AND RELATED FILL PACKS

CROSS-REFERENCE TO RELATED APPLICATIONS

The present application is a Section 371 of International Application No. PCT/US2019/062535, filed Nov. 21, 2019 and titled, "Open Mesh Members and Related Fill Packs" and claims the benefit of U.S. Provisional Patent Application No. 62/770,244 filed on Nov. 21, 2018 and titled "Open Mesh Members and Related Fill Packs" the entire contents of which are incorporated herein by reference in their entirety.

FIELD OF THE INVENTION

This disclosure relates generally to the field of cooling towers and more particularly to the field of trickle fills for counterflow cooling towers, including open mesh or wire frame members or panels that are assembled into fill packs. The trickle fills are typically configured for operation with strongly polluted or "dirty" water, but are not so limited and may be utilized in nearly any cooling tower with clean, lightly polluted, dirty water or nearly any variety of cooling medium.

BACKGROUND OF THE INVENTION

A cooling tower trickle fill is used for counterflow or crossflow cooling towers where clean water is not consistently available so "dirty" or strongly polluted water may flow through the fill material for cooling. The trickle fill material may also be utilized with clean water cooling towers or in cooling towers that utilize a combination of clean and dirty water. Some contamination may be present in the cooling water utilized with the preferred trickle fill and, therefore, a non-fouling, more open fill or open mesh is preferred so that biological materials do not build-up on the mesh members and strands to block flow and the mesh members can be reasonably cleaned. The term trickle fill or mesh fill refers to a product that is not a film fill. In the film fill, water creates a film on the surface of a structured sheet, which is generally solid and continuous from end to end. The trickle fill or wire frame fill is also not a splash fill where the water passes through the fill as droplets. The effective surface area of the fill is defined by the length of the members on which the water follows as it travels from the top of the fill pack to the bottom of the fill pack as it contacts air.

Trickle or mesh fill packs are generally bottom-supported and are cross-stacked in a cooling tower for structural integrity. The trickle or mesh fill packs are made up of mesh members connected mechanically, for example, by integrally formed rivets that are crushed after being nested with receivers or by snap fit connectors that are pressed together to form a mechanical lock between adjacent wire frames or mesh by interference fit male and female connectors. Such mechanical connections are described in U.S. Pat. No. 8,834,058, titled "Installation Element Of An Installed Packing" and U.S. Pat. No. 9,555,390 ("390 patent"), titled, "Snap-Lock Packing Element And Assembly Thereof for a Contact Assembly," the entire contents of which are incorporated herein by reference.

A trickle fill or mesh fill is generally an injection molded or extruded fill product and is comprised of small members interconnected with significant gaps therebetween or openings. The small interconnected members provide a continuous surface for water to flow from the top of the fill pack to the bottom, preferably without leaving the surface, as described in U.S. Pat. No. 6,096,407, titled, "Built-In Packing for Material Exchange and/or Heat Exchange Between Gases and Liquids," the entire contents of which are incorporated herein in its entirety. Trickle fills of this type, currently commercially available, have performance issues. The product design, specifically the sheet edge that forms the interface between upper and lower packs in an installed configuration, floods near or just above the interface during elevated water loading. This flooding is exacerbated by high air flows when higher cooling tower capacity is required and, thereby, large pressure drop and low operating efficiencies. The impact of the flooding on the performance of the cooling tower is a significant increase in the pressure drop through the fill. The increased pressure drop due to flooding at the interface impacts overall tower performance by reducing the air flow through the tower for a given fan power and, as a result, limiting the capacity or heat load that the tower can expel. Although data suggests that the flooding condition occurs only at a specific point or condition based on the rapid increase in pressure drop, this phenomenon impacts pressure drop at lower water loading rates and air flows as well. The flooding condition is also exacerbated by a higher water loading rate.

It is an object of the preferred invention to reduce or eliminate the flooding condition at the edge of the stacked trickle packs in a cooling tower. The flooding condition is defined by the interface fluid dynamics of the air/water combination leading to the flooding condition, where water is held-up in the upper trickle pack adjacent or proximate the interface with the lower trickle pack as the water flows through the cooling tower during operation. The preferred open mesh members and related fill packs address the flooding condition and facilitate consistent and even flow of water through the stacked trickle fill packs.

BRIEF SUMMARY OF THE INVENTION

In a preferred embodiment, the present invention is directed to an open mesh member for insertion into a cooling tower utilizing polluted or clean water and counterflow or crossflow airflow. The open mesh member includes a plurality of corrugations comprised of upper support frames, lower support frames and wall strands. The upper and lower support frames extend at a corrugation angle relative to a height axis. The corrugations have a plurality of openings through a thickness of the mesh member. A planar edge is positioned at a first end of the mesh member. A beveled edge is positioned at a second end of the mesh member. The beveled edge includes a leg having a distal end. The leg extends substantially parallel relative to and away from a first upper support frame of the upper support frames.

In another aspect, the preferred present invention is directed to an open mesh fill pack for insertion into a cooling tower utilizing polluted or clean water and counterflow or crossflow airflow. The fill pack includes a first mesh member including a first plurality of connection members, first side edges, a first beveled edge and a first planar edge. The first mesh member includes a first plurality of corrugations and is substantially open through a first thickness of the first mesh member. A second mesh member includes a second plurality of connection members, second side edges, a second beveled edge and a second planar edge. The second mesh member includes a second plurality of corrugations and is substantially open through a second thickness of the second mesh member. The first and second mesh members are secured by the first and second connections in an assembled configuration with the first beveled edge positioned proximate the second planar edge and the second beveled edge positioned proximate the first planar edge.

BRIEF DESCRIPTION OF THE SEVERAL VIEWS OF THE DRAWINGS

The foregoing summary, as well as the following detailed description of certain aspects of this disclosure, will be better understood when read in conjunction with the appended drawings. For the purpose of illustrating the preferred invention, there is shown in the drawings an example device according to the present disclosure. It should be understood, however, that the claimed or disclosed preferred embodiment of the present invention is not limited to the precise arrangements and instrumentalities shown. In the drawings:

DETAILED DESCRIPTION OF THE INVENTION

Figure 1:
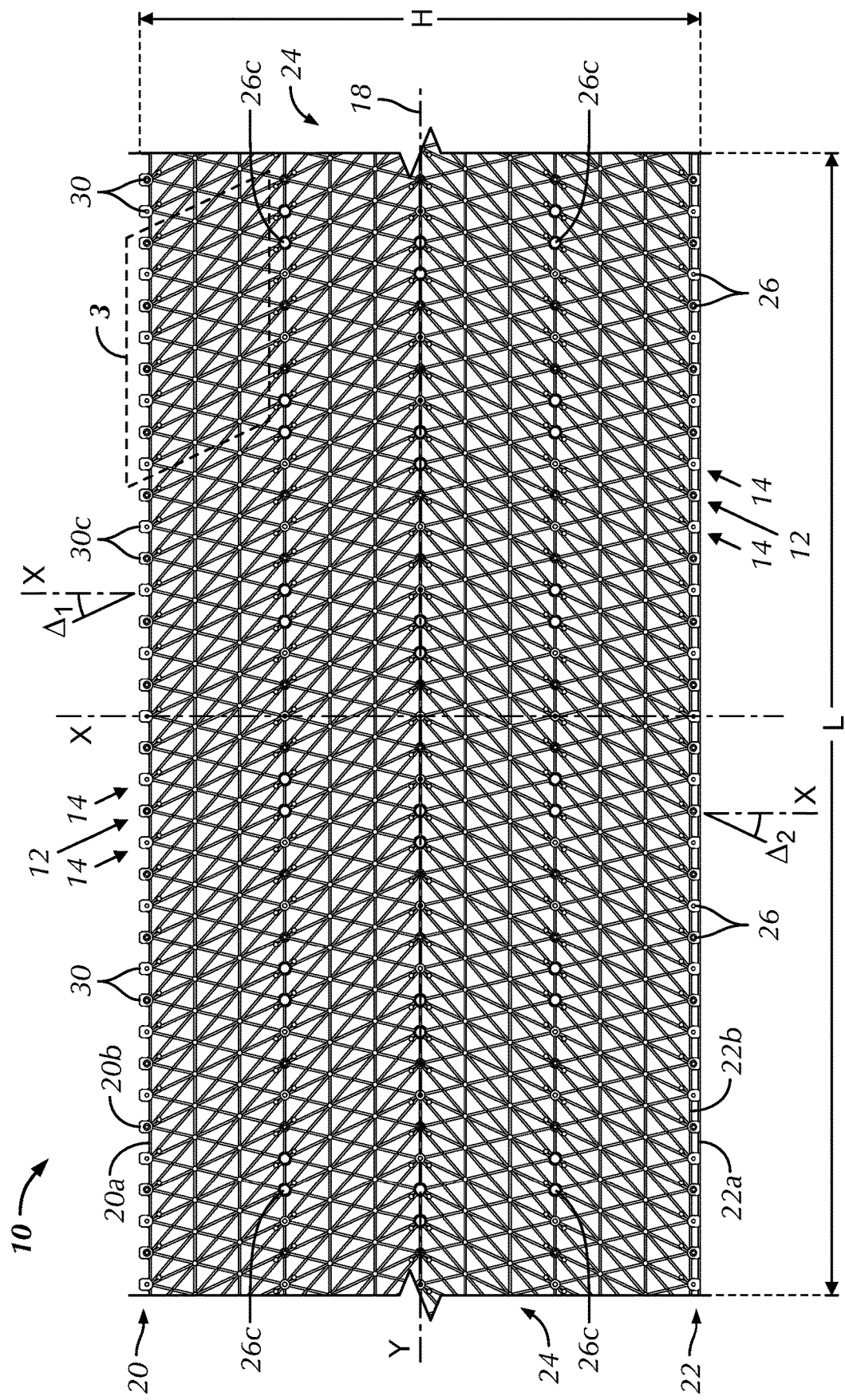
FIG. 1 is a front elevational view of an open mesh member in accordance with a preferred embodiment of the present invention.

Certain terminology is used in the following description for convenience only and is not limiting. The words "lower," "bottom," "upper," and "top" designate directions in the drawings or in the preferred positioning of the components of the preferred invention to which reference is made. The words "inwardly," "outwardly," "upwardly," "downwardly," "upper" and "lower" refer to directions toward and away from, respectively, the geometric center of the mesh members, trickle fill packs or related components, and designated parts thereof, in accordance with the present disclosure. Unless specifically set forth herein, the terms "a," "an," and "the" are not limited to one element, but instead should be read as meaning "at least one." The terminology includes the words noted above, derivatives thereof and words of similar import.

It should also be understood that the terms "about," "approximately," "generally," "substantially," and like terms, used herein when referring to a dimension or characteristic of a component or other aspect of this disclosure, indicate that the described dimension or characteristic is not a strict boundary or parameter and does not exclude minor variations therefrom that are functionally similar. At a minimum, references that include a numerical parameter include variations that, using mathematical and industrial principles accepted in the art (e.g., rounding, measurement or other systematic errors, manufacturing tolerances, etc.), would not vary the least significant digit.

Referring to FIGS. 1-4, an open mesh, wire frame member or trickle sheet, generally designated 10, according to the preferred invention may be constructed to have a height H of approximately eighteen inches (18") and a length L of approximately three feet (3'). The mesh members 10 are not limited to the described height H and length L and may be constructed having smaller or larger heights H and lengths L depending on designer or application preferences or requirements. The mesh member 10 defines a height axis X and a width axis Y with the height axis X extending generally in a top/bottom direction in an assembled configuration and the width axis Y extending generally laterally or parallel to a ground surface in the assembled configuration, as will be described in greater detail below. The individual mesh members 10 are configured in a chevron or herringbone arrangement, that is, the top half of the sheet has corrugations in one direction and the bottom has corrugations in the other direction. In the preferred embodiment, the corrugations are constructed of alternating rows of upper support frames 12 and lower support frames 14 that are separated by wall strands 16. The wall strands 16 extend between the upper and lower support frames 12, 14 to structurally support the mesh members 10 and the separate upper and lower support frames 12, 14, which carry a majority of the water that flows down the mesh members 10, as is described below.

The upper and lower frames 12, 14 extend at upper and lower corrugation angles $\Delta_1$, $\Delta_2$ relative to the height axis X. The upper and lower corrugation angles $\Delta_1$, $\Delta_2$ are preferably between approximately zero and forty-five degrees (0-45°), even more preferably approximately twenty to thirty degrees (20-30°) and are preferably the same, although the corrugation angles $\Delta_1$, $\Delta_2$ are not so limited. The upper and lower corrugation angles $\Delta_1$, $\Delta_2$ may be greater or smaller than the described ranges and may extend at different angles relative to the height axis X. The upper and lower frames 12, 14 preferably extend at the upper corrugation angle $\Delta_1$ to an inflection line 18 and at the lower corrugation angle $\Delta_2$ below the inflection line 18. The upper and lower frames 12, 14 preferably guide the water along the mesh members 10, as is described in greater detail below.

In the preferred embodiment, each of the mesh members 10 has a beveled edge 20, a generally planar edge 22 and two side edges 24. The beveled edge 20 and the planar edge 22 are positioned at opposite sides of each of the mesh members 10 along the height axis X and the side edges 24 are at opposite sides of each of the mesh members 10 along the width axis Y. Each of the mesh members 10 also preferably includes a plurality of connection members 26. In the preferred embodiment, the connection members 26 are comprised of opposing posts 26a and voids 26b that are mateable with each other, wherein the post 26a is inserted into the void 26b in an assembled or installed configuration to define trickle fills or trickle fill packs 28. In the first preferred embodiment, the posts 26a are positioned on the upper frames 12 at the beveled and planar edges 20, 22 and the voids 26b are positioned on the lower frames at the beveled and planar edges 20, 22. The mesh members 10 also preferably include additional mating posts 26a and voids 26b thereon spaced internally on the mesh members 20. In the assembled or installed configuration, the individual posts 26a extending through the mating void 26b and the posts 26a are preferably crushed or deformed to secure a first mesh member 10 to a second mesh member 10.

The connection members 26 are not limited to mating posts and voids 26a, 26b on the upper and lower frames 12, 14 and may have alternative configurations that replace the posts and voids 26a, 26b, such as the snap-lock connections of the '390 patent, on the upper and lower frames 12, 14 that facilitate connecting the mesh members 10 to each other to define the trickle fills or trickle fill packs 28. The trickle fills or trickle fill packs 28 are preferably constructed of pluralities of the mesh members 10 secured together at the connection members 26 with alternating mesh members 10 having the beveled edge 20 and the planar edge 22 at the top or at the bottom of the fill pack 28, respectively. The preferred fill packs 28 are, therefore, cross-corrugated with each of the opposing upper and lower frames 12, 14 of the connected mesh members 10 extending at the upper or lower corrugation angles $\Delta_1$, $\Delta_2$ at opposite angles relative to the height axis X. The connection members 26 are also not limited to the mating posts and voids 26a, 26b or the integrally formed snap-lock connections 26 and may further be comprised holes 26c formed through the upper and lower frames 12, 14 that accept a fastening member (not shown), such as a rod, screw, bolt, zip-tie or other fastener to align the mesh members 10 in the fill pack 28 and secure the mesh members 20 together in the assembled or installed configuration. The connection members 26 may be comprised of nearly any connection member or features that facilitates alignment of the adjacent mesh members 10 and securing of the mesh members 10 to each other, such as the mating posts and voids 26a, 26b, the snap-lock connections of the '390 patent, the holes 26c through the mesh members 10 that accept rods, zip-ties, fasteners, clamps or other connecting features that secure the mesh members 10 together to define the fill packs 28.

The inflection line 18 of the upper and lower frames 12, 14, which is preferably at the center of the mesh member 10 approximately halfway along the height axis X, allows for continuity in the corrugations of the upper and lower support frames 12, 14 from the beveled edge 20 to the planar edge 22. The beveled and planar edges 20, 22 preferably extend generally parallel to the inflection line 18. The beveled edge 20 preferably includes a bevel 30 that extends away from the mesh member 10 proximate the ends of the upper and lower frames 12, 14. The bevel 30 is preferably comprised of a portion of the mesh members 10 that extends from the body of the mesh member 10 to narrow or concentrate a flow of water from the body of the mesh member 10 to a distal end 31c of the bevel 30. The bevel 30 is not necessarily a traditional "bevel" that is an edge of a structure that is not perpendicular to faces of the structure, such as beveled tips or edges of a Brentwood Industries, Inc. Accu-Pac Film Fill Media. The distal end 31c of the bevel 30 is offset from the upper and lower frames 12, 14 at an offset length LO of approximately one-half inch (½") and is also preferably in-line with the shape of the upper and lower support frames or corrugations 12, 14. The bevels 30 are not limited to the shape and configuration shown in the attached figures and may be comprised of portions of structure extending from the upper and lower frames 12, 14 away from the mesh member 10. The bevels 30 may be comprised of extensions from a relatively smooth and solid beveled edge 20 of the mesh member 10 that extends from the mesh member 10. The bevels 30 are also not limited from extending only from the beveled edge 20 and may also extend from the planar edge 22 without significantly impacting the function of the mesh member 10 and the fill packs 28. The design and configuration of the preferred bevels 30 also stabilizes the planar edge 22 that extends to form the bottom and top of the fill pack 28 when the fill packs 28 are stacked in an installed or assembled configuration and an interface between stacked fill packs 28 is also stabilized by interaction between the bevels 30 and the planar edges 22 in the stacked configuration.

The corrugation angles $\Delta_1$, $\Delta_2$ place the bevel 30 at an offset alignment from the direction of airflow, which may be substantially parallel to the height axis X, a direction perpendicular to the beveled and planar edge 20, 22 in a counterflow arrangement or substantially parallel to the width axis Y of the mesh member 10 in a crossflow arrangement. The bevels 30 include first, second, third, fourth, fifth, sixth, seventh and eighth bevels 30 in FIG. 3, wherein each of the bevels 30 extend from the wall strands 16 and the upper and lower support frames 12, 14. The bevels 30 of the preferred embodiment have a generally solid and flat puck-shaped configuration with a substantially straight distal end 31c and an arcuate proximal end for connection to the upper and lower support frames 12, 14. The bevels 30 are not so limited and may include a first leg, a second leg and the distal end may extend between the first and second legs, thereby creating a void between the first and second legs and the distal end. The preferred bevels 30, however, include the flat, puck-shaped configuration to accommodate the connection members 26 at each of the bevels 30. The bevels 30 may also be considered double-bevels 30 in that each pair of adjacent upper and lower frames 12, 14 of the preferred mesh members 10 each include a bevel 30 at their ends, although the mesh members 10 and the beveled edge 20 are not so limited and the bevels 30 may be arranged at ends of only select ones of the upper and lower frames 12, 14 or may be otherwise arranged and configured to take on the general function of the preferred bevels 30, as is described herein.

The bevels 30 preferably provide for a narrowing or concentration of the flow of water from the mesh member 10 so that the water or other cooling fluid or mixture flows relatively smoothly between an upper fill pack 28a and a lower fill pack 28b at an interface between the upper and lower fill packs 28a, preferably, specifically where the distal ends 31c of the bevels 30 contact the lower fill pack 28b at the planar edge 22 or nearly any other portion of the lower fill pack 28b in the assembled or installed configuration. The narrowing of the flow and relatively smooth flow at the interface between the upper and lower fill packs 28a, 28b through the preferred bevels 30 limits entrainment and promotes flow and transfer of the water or fluid mixture from the upper fill pack 28a to the lower fill pack 28b.

The beveled edge 30 of the mesh member 10 is designed with an edge "return" that aligns two proximate horizontal members 22a, 22b in the vertical direction, regardless of whether the beveled edge 30 is at a top or bottom of the fill pack 28. The two horizontal members 22a, 22b of the planar edge 22 are preferably in the same position so that the air flow impacts an outer planar edge 22a completely when the planar edge 22 is at the bottom of the fill pack 28, but an inner planar edge 22b is directly in line from an air flow direction with the outer planar edge 22a. The two proximate horizontal members 22a, 22b substantially define the planar edge 22. The positioning of the horizontal members 22a, 22b eliminates the projected surface area of the feature with respect to air flow minimizing the effects of pressure drop. This also minimizes the potential for water buildup behind the outer and inner planar edges 22a, 22b as the air travels in an opposite and vertical direction. Additionally, the outer planar edge 22a of the planar edge 22 is not present at the beveled edge 20 because of the bevels 30. The planar edge 22 that would be at the outer edge of the beveled edge 20 is "cut out" of the corrugation walls that extend from the adjacent connections 26 and bevels on the upper support frame 12 to the connections 26 and bevels 30 at the adjacent connection 26 on the lower support frame 14. An angled member or first and second legs 31a, 31b replace the horizontal member or planar edge 22 and extends from the connection 26 to the adjacent connection 26 at an angle of at least thirty degrees (30°) with the horizontal. The bevels 30 support the connections 26 and enable water that follows along the upper and lower support frames or corrugations 12, 14 to flow to and past the connections 26, thereby reducing or eliminating the water hold up in the main airflow by providing a surface area that the water travels along to move to and past the connections 26.

Figure 4:
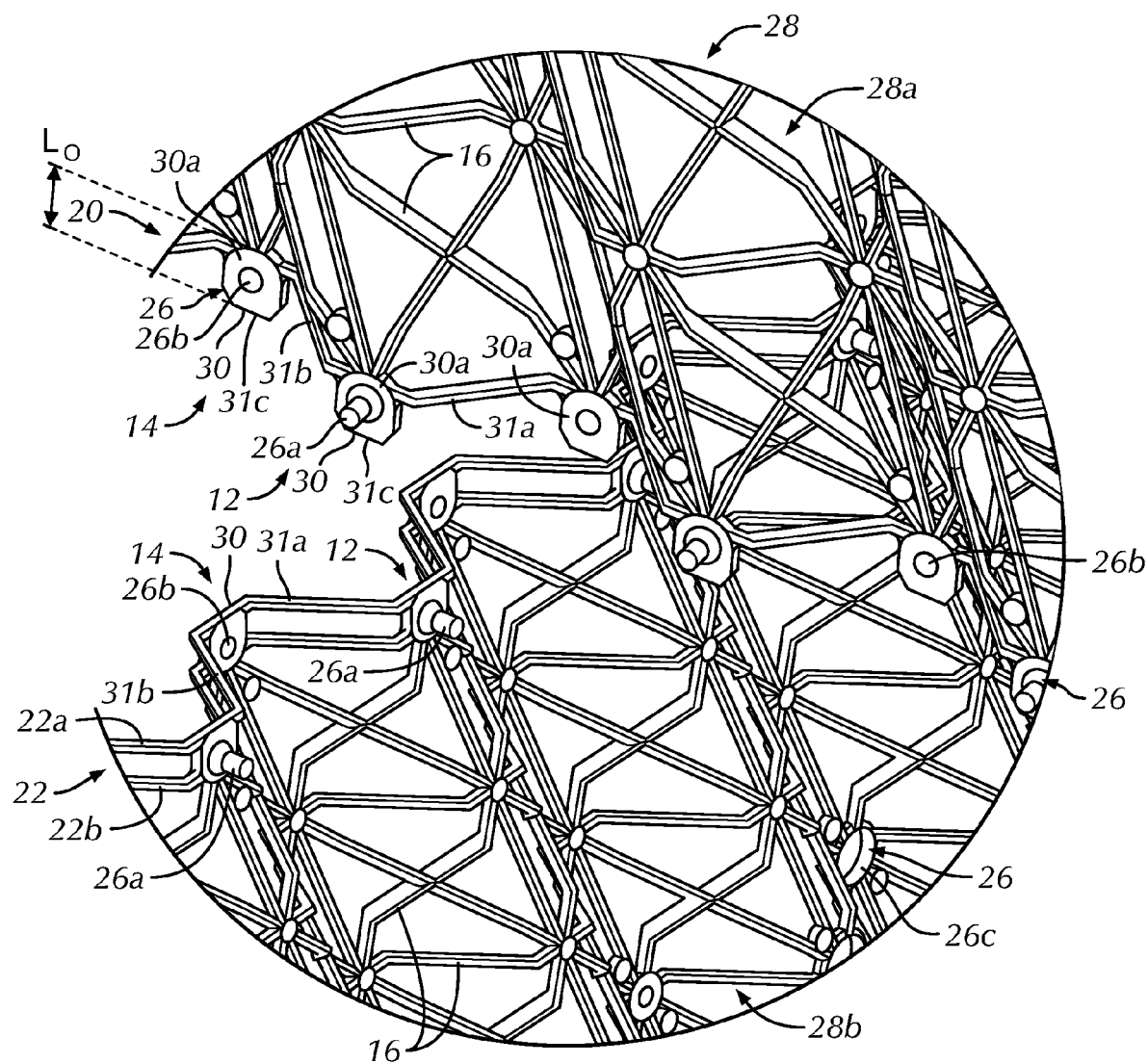
FIG. 4 is a magnified, partial cut-away, front perspective view of an intersection between an upper fill pack and a lower fill pack constructed utilizing the preferred open mesh members of FIG. 1 to define a fill pack.

The bevels 30 of the preferred embodiment are supported by the two legs 31a, 31b, including the first leg 31a and the second leg 31b that extend from the proximate support frames 12, 14 proximate the connections 26 and the upper and lower support frames 12, 14 to a proximate or inner portion of the bevels 30, although the legs 31a, 31b may be comprised of a single leg (not shown) extending from the wall strands 16 or from the upper and lower support frames 12, 14 to the distal ends 31c. The distal ends 31c preferably align with the upper and lower support frames 12, 14 and the flat puck-shape of the bevels 30 include flow plates 30a that extend outwardly from the connections 26 to the distal ends 31c and inwardly from the connections 26 to direct the water from the upper and lower support frames 12, 14 to the adjacent mesh member 10 at an interface between the upper fill pack 28a and the lower fill pack 28b in an installed or assembled configuration in a cooling tower (FIG. 4). The flow plates 30a may also be comprised of or considered a leg that extends away from the mesh member 10, generally parallel relative to the upper or lower support frames 12, 14 at the beveled edge 20.

Referring to FIGS. 1 and 4, the mesh member 10 is preferably assembled with a plurality of additional mesh members 10 to construct the fill packs 28a, 28b. The mesh members 10 are preferably selectively connected or secured to each other using the connection members 26. The planar edge 22 has a relatively planar or standard edge that generally follows the shape of the upper and lower support frames or corrugations 12, 14, including the upper support frame 12, the lower support frame 14 and the wall strands 16. The preferred planar edge 22 includes the outer planar edge 22a and the inner planar edge 22b. The outer and inner planar edges 22a, 22b support the plurality of the connections 26 so that the connections 26 are spaced generally inwardly from the outer planar edge 22a. The inclusion of the outer and inner planar edges 22a, 22b finishes the mesh member 10 and sets the connections 26 for stacking. The outer and inner planar edges 22a, 22b also stabilize the mechanical assembly when the connections 26 are attached to mating connections of the second mesh member 10 adjacent the beveled edge 20.

Figure 2:
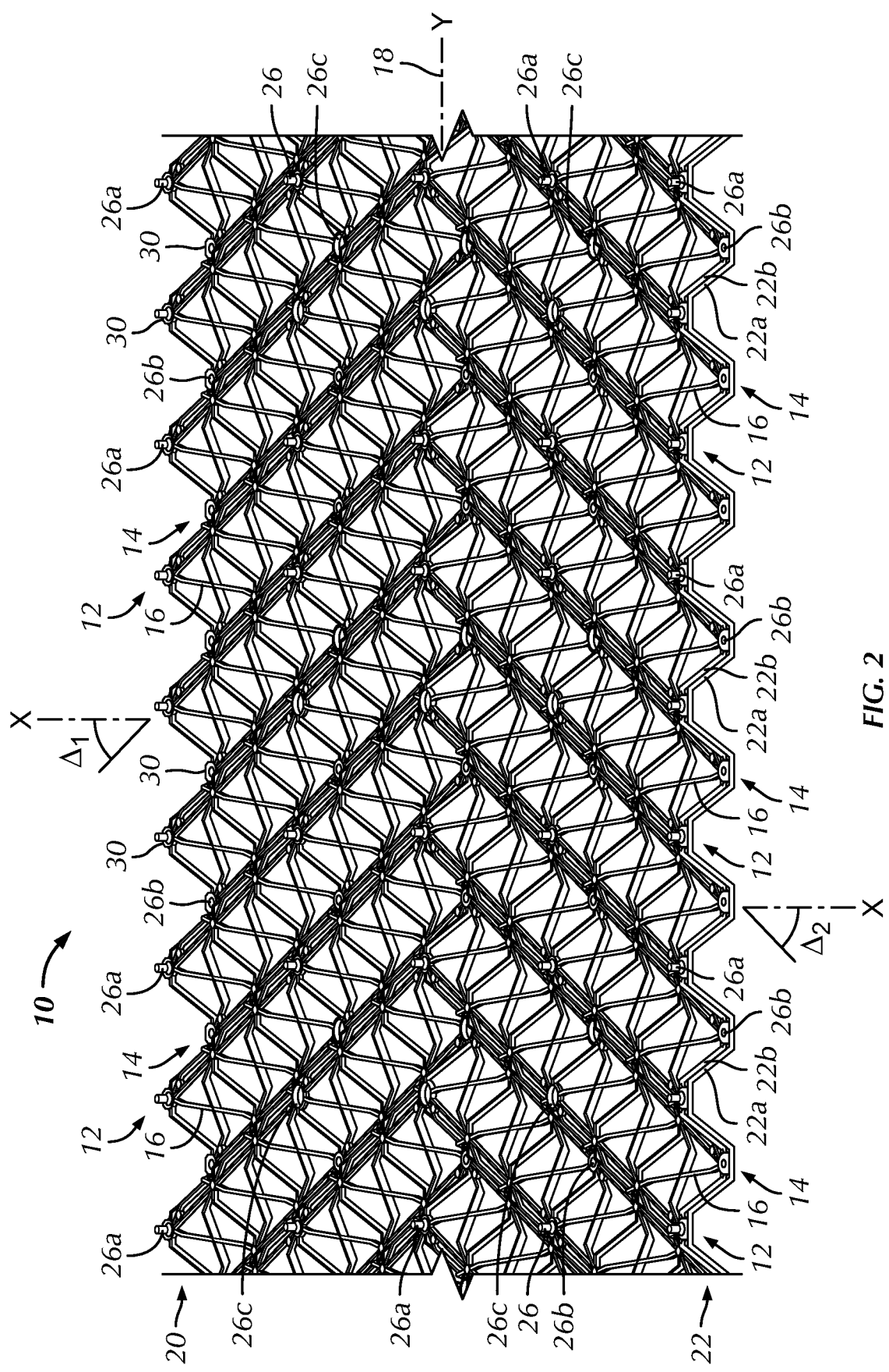
FIG. 2 is a top perspective view of the open mesh member of FIG. 1.

Referring to FIGS. 2 and 4, the fill pack 28 with the mesh members 10 stacked in alternately pivoted orientations with the beveled edge 20 alternating with the planar edge 22 at the top of the fill pack 28 for adjacent mesh members 10 provides alternative relatively large gaps between the bevels 30. The fill packs 28 each include this alternating beveled and planar edge 20, 22 arrangement to facilitate flow of the water between the top and bottom fill packs 28a, 28b by limiting blocking structure at the interface. The mesh members 10 are rotated approximately one hundred eighty degrees (180°) relative to an axis (not shown) that is generally perpendicular to the height and width axes X, Y when assembled to assemble the fill packs 28a, 28b. The mesh members 10 are preferably injection molded to form each of the structures of the mesh member 10, such that the structures of each of the mesh members 10 are integrally molded or formed with each other. Rotating the mesh members 10 approximately one hundred eighty degrees (180°) relative to each other for assembly results in the ability to form each of the injection molded mesh members 10 in a single mold to limit investment in injection molding tools and inventory, sales, and assembly of multiple parts. The beveled edge 20 positioned at both top and bottom edges of the fill packs 28a, 28b also benefits the anti-flooding bevels 30 by improving anti-flooding performance at the stacked interface of the upper and lower fill packs 28a, 28b, thereby eliminating potential installation errors, as both top and bottom sides of the fill packs 28a, 28b include the anti-flooding bevels 30 extending therefrom to reduce or eliminate flooding at the interfaces between the fill packs 28a, 28b.

Figure 3:
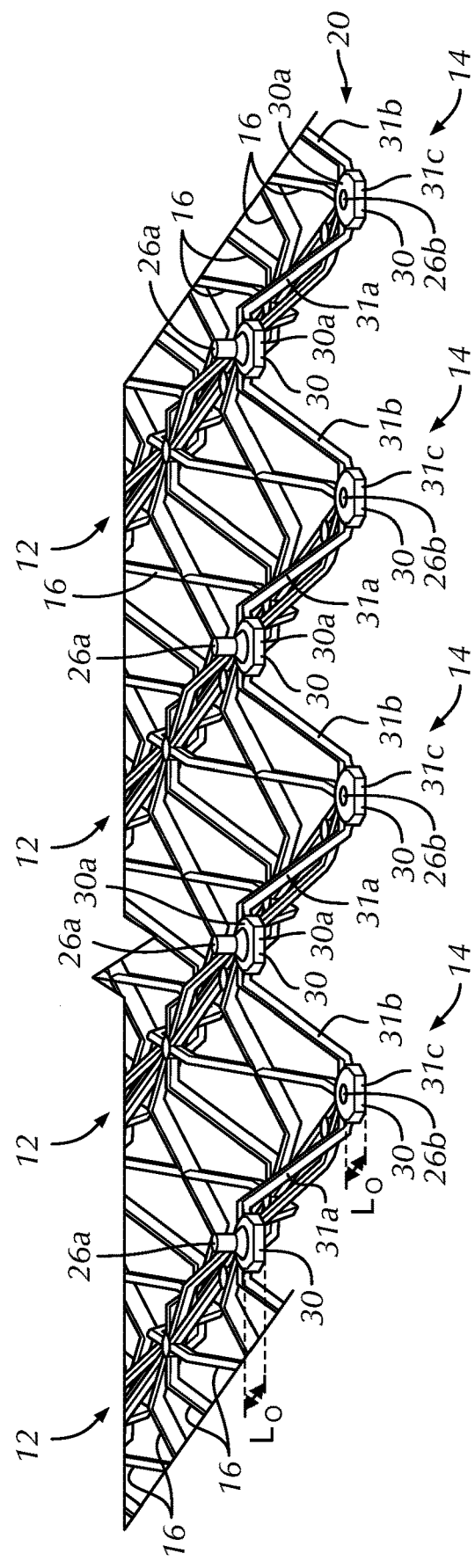
FIG. 3 is an enlarged, partial top perspective view of the open mesh member of FIG. 1, taken from within shape 3 of FIG. 1.

Referring to FIGS. 3 and 4, the legs 31a, 31b of the bevels 30 along the beveled edge 20 have a slope that is relatively high to aid in draining the water along the beveled edge 20 and onto an adjacent mesh member 10. In operation, the wall strands 16 carry a limited amount of the flow of water or other cooling fluid mixture in the cooling tower and a majority of the water is carried by the upper and lower support frames 12, 14 between the planar edge 22 and the beveled edge 20 along the corrugations. The bevels 30 and the flow plates 30a, therefore, facilitate flow of the water from the upper and lower support frames 12, 14 and onto the lower, adjacent mesh member 10 in the cooling tower.

Referring to FIG. 4, a partial cut-away view of an interface between the upper and lower fill packs 28a, 28b is shown with a portion of the beveled edge 20 and planar edge 22 of the lower fill pack 28b and a mating portion of the beveled edge 20 and planar edge 22 of the upper fill pack 28a to depict the interaction of the beveled and planar edges 20, 22 at the interface. In the prior art open mesh fill packs or trickle packs, flooding occurs at this interface as the result of structural member blockage at the interface, which is potentially exacerbated by airflow. The beveled and planar edges 20, 22 of the preferred fill packs 28a, 28b at this interface provide additional open space and flow connections along the upper and lower support frames 12, 14 to limit or prevent flooding at the interface and permit continuous flow of the water or other cooling fluid mixture through the interface onto the corrugations of the lower fill pack 28b.

It will be appreciated by those skilled in the art that changes could be made to the embodiment described above without departing from the broad inventive concept thereof. It is understood, therefore, that the scope of this disclosure is not limited to the particular embodiment disclosed, but it is intended to cover modifications within the spirit and scope thereof.

We claim:

1. An open mesh member for insertion into a cooling tower utilizing polluted or clean water and counterflow or crossflow airflow, the open mesh member comprising:
    a plurality of corrugations comprised of upper support frames, lower support frames and wall strands, the upper and lower support frames extending at a corrugation angle relative to a height axis, the plurality of corrugations having a plurality of openings through a thickness of the mesh member;
    a planar edge at a first end of the mesh member; and
    a beveled edge at a second end of the mesh member, the beveled edge including a generally planar plate having a distal end, the plate extending substantially parallel relative to and away from a first upper support frame of the upper support frames.

2. The open mesh member of claim 1, wherein the plurality of corrugations, the planar edge and the beveled edge are constructed of a polymeric material.

3. The open mesh member of claim 2, wherein the polymeric material is a polypropylene material.

4. The open mesh member of claim 1, wherein the corrugation angle includes an upper corrugation angle and a lower corrugation angle, the beveled edge including a first bevel extending distally from one of the upper support frames, the first bevel having a first distal end.

5. The open mesh member of claim 4, wherein the corrugation angle is between twenty and thirty degrees, the beveled edge including a second bevel and a third bevel.

6. The open mesh member of claim 1, wherein the beveled edge includes a plurality of bevels, wherein each of the upper and lower support frames are associated with one of the plurality of bevels at the beveled edge.

7. The open mesh member of claim 1, wherein a height is defined between the planar edge and the beveled edge and a length is defined between first and second side edges.

8. The open mesh member of claim 7, wherein the height is approximately eighteen inches and the length is approximately three feet.

9. The open mesh member of claim 1, further comprising:
a plurality of connection members integrated into the plurality of corrugations.

10. The open mesh member of claim 9, wherein the plurality of connection members is associated with the upper and lower support frames.

11. The open mesh member of claim 1, wherein the plurality of corrugations extend at a first corrugation angle and a second corrugation angle relative to the height axis.

12. The open mesh member of claim 1, wherein the plurality of corrugations extend at a first corrugation angle on a first side of an inflection line and at a second corrugation angle at a second side of the inflection line.

13. The open mesh member of claim 12, wherein the inflection line is positioned at a mid-point of a height of the mesh member.

14. An open mesh fill pack for insertion into a cooling tower utilizing polluted or clean water and counterflow or crossflow airflow, the fill pack comprising:
a first mesh member including first side edges, a first beveled edge and a first planar edge, the first mesh member including a first plurality of corrugations and being substantially open through a first thickness of the first mesh member; and
a second mesh member including second side edges, a second beveled edge and a second planar edge, the second mesh member including a second plurality of corrugations and being substantially open through a second thickness of the second mesh member, the first and second mesh members secured by first and second connections in an assembled configuration with the first beveled edge positioned proximate the second planar edge and the second beveled edge positioned proximate the first planar edge.

15. The fill pack of claim 14, wherein the first and second plurality of corrugations extend at a corrugation angle relative to a height axis of the first and second mesh members, respectively.

16. The fill pack of claim 14, wherein the first plurality of corrugations include a first upper support frame, a first lower support frame and a first wall strand, the first wall strand connecting the first upper and lower support frames.

17. The fill pack of claim 14, wherein the first and second mesh members are constructed of an injection molded polymeric material.

18. The fill pack of claim 14, wherein the first beveled edge includes a first plurality of bevels.

19. The fill pack of claim 18, wherein the first plurality of bevels includes a first bevel, the first bevel has a first distal end, the first bevel extending substantially along a corrugation angle of the first plurality of corrugations.

20. The fill pack of claim 14, wherein the first plurality of corrugations define a corrugation angle, the corrugation angle including an upper corrugation angle and a lower corrugation angle.

21. The fill pack of claim 14, wherein the first mesh member includes a first plurality of connection members and the second mesh member includes a second plurality of connection members.

* * * * *